United States Patent
Watanabe

(10) Patent No.: US 7,523,398 B2
(45) Date of Patent: Apr. 21, 2009

(54) CLIENT/SERVER SYSTEM AND BUTTON UPDATING METHOD FOR CLIENT APPLICATION

(75) Inventor: Yoshiaki Watanabe, Asaka (JP)

(73) Assignee: Fujifilm Corporation, Tokyo (JP)

( * ) Notice: Subject to any disclaimer, the term of this patent is extended or adjusted under 35 U.S.C. 154(b) by 708 days.

(21) Appl. No.: 10/046,175

(22) Filed: Jan. 16, 2002

(65) Prior Publication Data

US 2002/0122070 A1 Sep. 5, 2002

(30) Foreign Application Priority Data

Jan. 16, 2001 (JP) .............................. 2001-008068

(51) Int. Cl.
*G06F 3/00* (2006.01)
(52) U.S. Cl. ..................... 715/745; 715/746; 715/825; 715/826; 715/762; 715/716
(58) Field of Classification Search ................. 715/745, 715/744, 746, 825, 826, 762, 716, 866
See application file for complete search history.

(56) References Cited

U.S. PATENT DOCUMENTS

| | | | |
|---|---|---|---|
| 5,950,000 A * | 9/1999 | O'Leary et al. ............. 717/105 |
| 6,014,638 A * | 1/2000 | Burge et al. .................... 705/27 |
| 6,029,196 A | 2/2000 | Lenz | |
| 6,040,829 A | 3/2000 | Croy et al. | |
| 6,182,094 B1 * | 1/2001 | Humpleman et al. ......... 715/513 |
| 6,182,116 B1 * | 1/2001 | Namma et al. ............... 709/204 |
| 6,192,282 B1 * | 2/2001 | Smith et al. .................... 700/19 |
| 6,195,667 B1 * | 2/2001 | Duga et al. .................. 715/513 |
| 6,266,060 B1 * | 7/2001 | Roth .......................... 715/853 |
| 6,282,709 B1 * | 8/2001 | Reha et al. ................... 717/175 |
| 6,295,479 B1 * | 9/2001 | Shima et al. ................... 700/83 |
| 6,335,742 B1 * | 1/2002 | Takemoto .................... 715/781 |

(Continued)

FOREIGN PATENT DOCUMENTS

EP 0 749 079 A2 12/1996

(Continued)

OTHER PUBLICATIONS

Abrams M., "User Interface Markup Language (UIML) Draft Specification—Language Version 2.0a", *Internet Citation*, pp. 1-64, (Jan. 17, 2000).

(Continued)

*Primary Examiner*—Stephen S Hong
*Assistant Examiner*—Ryan F Pitaro
(74) *Attorney, Agent, or Firm*—Birch, Stewart, Kolasch & Birch, LLP

(57) ABSTRACT

The client/server system enables functions of GUI buttons provided on a client application to be easily changed. The client application connects to a menu server residing on a network to download information on menu buttons. Button information includes button IDs unique to the menu buttons, parameter values specifying functions of the menu buttons, and information on images of the menu buttons. The menu server uses user personal information to distribute menu button information suitable to each user. The client application reads button IDs from menu information obtained from the menu server and compares them with button information saved in a storage area of a client computer to avoid duplicate downloading of the same button information.

34 Claims, 12 Drawing Sheets

U.S. PATENT DOCUMENTS

| | | | |
|---|---|---|---|
| 6,429,882 B1* | 8/2002 | Abdelnur et al. | 715/763 |
| 6,477,576 B2* | 11/2002 | Angwin et al. | 709/226 |
| 6,483,523 B1* | 11/2002 | Feng | 715/745 |
| 6,583,797 B1* | 6/2003 | Roth | 715/810 |
| 6,583,799 B1* | 6/2003 | Manolis et al. | 715/838 |
| 6,584,507 B1* | 6/2003 | Bradley et al. | 709/229 |
| 6,735,767 B1* | 5/2004 | Bleizeffer et al. | 717/174 |
| 6,784,900 B1* | 8/2004 | Dobronsky et al. | 715/744 |
| 6,785,822 B1* | 8/2004 | Sadhwani-Tully | 713/201 |
| 6,788,313 B1* | 9/2004 | Heil | 715/745 |
| 6,819,343 B1* | 11/2004 | Sobeski et al. | 715/848 |
| 6,828,992 B1* | 12/2004 | Freeman et al. | 715/810 |
| 6,931,600 B1* | 8/2005 | Pittman | 715/767 |
| 2001/0026291 A1* | 10/2001 | Uchida | 345/810 |
| 2002/0057298 A1* | 5/2002 | Wassom et al. | 345/825 |
| 2002/0063736 A1* | 5/2002 | Sugimoto | 345/762 |
| 2002/0077829 A1* | 6/2002 | Brennan et al. | 704/275 |
| 2002/0093523 A1* | 7/2002 | Ashe et al. | 345/700 |
| 2002/0116226 A1* | 8/2002 | Auer et al. | 705/3 |

FOREIGN PATENT DOCUMENTS

| | | |
|---|---|---|
| WO | WO 00/23884 A1 | 4/2000 |

OTHER PUBLICATIONS

"Web Design Technique Dai 4 Kai Navigation No Tsukurikata (Web Design Technique No. 4: How to Create Navigation)" Internet ASCII, vol. 4, No. 2, pp. 182-184, ASCII Corp, Feb. 1, 1999. (CSDB: Domestic Technical Magazine 200000385014).

"JavaScript De Tsukuru Otegaru Interactive Homepage Dai 3 Kai Jikangawari/Higawari Message (Interactive Homepage Easily Created with JavaScript No. 3: Hourly/Daily Message)", Homepage Magazine, Nov. 1998, pp. 210-213, Impress Corporation, Oct. 29, 1998 (CSDB: Domestic Technical Magazine 200000459016).

* cited by examiner

FIG.6

EVENT OBTAINMENT REQUEST

| REQUEST | | | REMARKS |
|---|---|---|---|
| ACCESS RESOURCE | xx_future-g.com/viewer/event | | |
| PROPERTY | PROPERTY | NAME | |
| | USER ID | USER ID | |
| | USER PW | PASSWORD | |
| | EXE TIMES | NUMBER OF VIEWER ACTIVATION OPERATIONS | |
| | TOTAL MINUTES | TOTAL TIME FOR WHICH VIEWER HAS BEEN USED | |
| | LATEST INTERVAL | NUMBER OF DAYS THAT HAVE PASSED SINCE LAST USE OF VIEWER | |
| | (TEST FLAG) | (FLAG FOR TESTS) | PROPERTY THAT CAN BE ADDED USING VIEWER OPTION TOOL (TESTFLAG=1) |

FIG.7

DATA TRANSMITTED FROM MENU SERVER TO CLIENT AS MENU INFORMATION

| ELEMENT (PARAMETER NAME) | DATA FORMAT | DISCRIPTION |
|---|---|---|
| session-id | 64 OR LESS LATERALLY HALF CHARACTERS | STRING ISSUED BY SERVER |
| tool-tip | 255BYTES | DESCRIPTION TEXT FOR MENU |
| loading-msg-id | INTEGER(INT 4BYTES) | 0-4294967295<br>0-1000000000 FOR EACH TIME DISPLAY<br>1000000001-FOR SINGLE DISPLAY |
| loading-msg-sentence | 255BYTES | MESSAGE TEXT |
| complete-msg-id | INTEGER(INT 4BYTES) | 0-4294967295<br>0-1000000000 FOR EACH TIME DISPLAY<br>1000000001-FOR SINGLE DISPLAY |
| complete-msg-sentence | 255BYTES | MESSAGE TEXT |
| complete-msg-url | 255BYTES | URL OF WWW PAGE OPENED WHEN LOADING IS COMPLETED |
| button-count | INTEGER(INT 4BYTES) | NUMBER OF BUTTONS |
| button-id | INTEGER(INT 4BYTES) | BUTTON IDS(ONE OR MORE)<br>0-4294967295 |

FIG.8

EXAMPLE OF TRANSMITTED MENU INFORMATION XML

```
<?xml version="1.0"encoding="UTF-8"?>
<!DOCTYPE response SYSTEM"servicelist.dtd">
<response>

<session-id>xxxxxxxxxxxxxxxxxxxxxxxxxxxxxxxxxx</session-id>
    <service-list>
        <tool-tip>WELLCOME ,TO FinePix INTERNET SERVICE!</tool-tip>
        <loading-msg-id>12</loading-msg-id>
        <loading-msg-sentence>DURING LOAD</loading-msg-sentence>
        <complete-msg-id>13</complete-msg-id>
        <complete-msg-sentence>LOAD COMPLETE</complete-msg-sentence>
        <complete-msg-url></complete-msg-url>
        <button-count>5</button-count>
        <button-id>1</button-id>
        <button-id>45</button-id>
        <button-id>56</button-id>
        <button-id>22<button-id>
        <button-id>4</button-id>

</service-list>
</responce>
```

FIG.9

CONTENTS OF DATA TRANSMITTED FROM MENU SERVER TO CLIENT
AS BUTTON INFORMATION

| ELEMENT (PARAMETER NAME) | DATA FORMAT | DESCRIPTION |
|---|---|---|
| button-id | INTEGER(INT 4BYTES) | BUTTON ID 0-4294967295 |
| service-id | INTEGER(INT 4BYTES) | SERVICE ID 0-4294967295 |
| caption | 255BYTES | BUTTON NAME TEXT*RESERVATION TAG |
| view-category | | DISPLAY CATEGORY*RESERVATION TAG |
| service-name | 255BYTES | SERVICE NAME |
| condition-flag | 0x0000=OPERATE REGARDLESS OF CONDITIONS<br><br>0x0001=ENABLED ONLY DURING CONNECTION TO ACTUAL MACHINE(STORAGE MODE)<br><br>0x0002=ENABLED ONLY DURING CONNECTION TO ACTUAL MACHINE(VG MODE)<br><br>0x0100=ENABLED ONLY DURING SELECTION OF IMAGES<br><br>0x8000=ALWAYS DISABLED | CONDITION FLAG USED TO DETERMINE WHETHER BUTTON IS TO BE ENABLED OR DISABLED (ONE OR MORE LOGICAL ORS) EXAMPLE) 0x0103=CONNECTION TO ACTUAL MACHINE AND IMAGE SELECTION REQUIRED |
| action-type | 0x0001:ONLY SERVICE ACCESS COUNT<br><br>0x0010:ONLY IMAGE TRANSFER USING GFNAP2<br><br>0x0100:ONLY USER INFORMATION TRANSMISSION | CONDITION FLAG USED TO DETERMINE OPERATION WHEN BUTTON IS DEPRESSED (ONE OR MORE LOGICAL ORS) |
| upload-img-min | INTEGER(INT 4BYTES) | MINIMUM NUMBER OF TRANSFERRED IMAGES |
| upload-img-max | INTEGER(INT 4BYTES) | MAXIMUM NUMBER OF TRANSFERRED IMAGES |
| upload-img-type | 0X0001:STILL IMAGE FILE<br><br>0X0010:ANIMATED IMAGE FILE<br><br>0x0100:SOUND FILE | CONDITION FLAG USED TO DETERMINE TYPE OF FILE THAT CAN BE UPLOADED(LOGICAL OR AVAILABLE) |
| link-address | 255BYTES | URL OF WWW PAGE FOR CONNECTION SERVICE |
| link-option | 255BYTES | ARGUMENT FOR LINK ADDRESS |
| enable-tool-tip | 255BYTES | BALLOON HELP TEXT FOR ENABLED BUTTON |

FIG.10

| | | |
|---|---|---|
| disable-tool-tip | 255BYTES | BALLOON HELP TEXT FOR ENABLED BUTTON |
| enable-button | 255BYTES | URL OF IMAGE FILE |
| disable-button | 255BYTES | URL OF IMAGE FILE |
| img-x-min(RESERVED) | INTEGER(INT 4BYTES) | MINIMUM NUMBER OF PIXELS(LATERAL) |
| img-y-min(RESERVED) | INTEGER(INT 4BYTES) | MINIMUM NUMBER OF PIXELS(LONGITUDINAL) |
| img-x-max(RESERVED) | INTEGER(INT 4BYTES) | MAXIMUM NUMBER OF PIXELS(LATERAL) |
| img-y-max(RESERVED) | INTEGER(INT 4BYTES) | MAXIMUM NUMBER OF PIXELS(LONGITUDINAL) |
| img-size-max (RESERVED) | INTEGER(INT 4BYTES),UNIT:KBYTES | MAXIMUM FILE SIZE |
| img-format(RESERVED) | EXTENSION DESCRIBED USING COLONS | TRANSMITTABLE IMAGE FORMAT |
| appear-date (RESERVED) | yyyymmdd | DISPLAY START DATE AND TIME |
| disappear-date (RESERVED) | yyyymmdd | DISPLAY END DATE AND TIME |

FIG.11

EXAMPLE OF TRANSMITTED BUTTON INFORMATION XML

```
<?xml version="1.0"encording="UTF-8"?>
<!DOCTYPE response SYSTEM"button.dtd">
<response>

<button-id>1</button-id>

<service-id>1</service-id>

<caption>FDi SERVICE</caption>

<view-category>3</view-category>

<service-name>fdi</service-name>

<condition-flag>0x0100</condition-flag>

<action-type>0x0001</action-type>

<upload-img-min>1</upload-img-min>

<upload-img-max>3</upload-img-max>

<upload-img-type>0x0001</upload-img-type>

<link-address>http://www.xxxxxxx.co.jp/</link-address>

<link-option></link-option>

<enabled-tool-tip>UP TO THREE IMAGES CAN BE SELECTED</enabled-tool-tip>

<disabled-tool-tip>SELECT IMAGES<disabled-tool-tip>

<enabled-button>http://jp.future-g.com/viewer/button/xxxxxxxx.jpg</enabled button>

<disabled-button>http://jp.future-g.com/viewer/button/xxxxxxxx.jpg</disabled-button>

<img-x-min>320</img-x-min>

<img-y-min>240</img-y-min>

<img-x-max>640</img-x-max>

<img-y-max>480,/img-y-max>

<img-size-max.>100</img-size-max>

<img-format>jpg:gif:bmp</img-format>

<appear-date>20010401</appear-date>

<disappear-date>20010433</disappear-date>

</response>
```

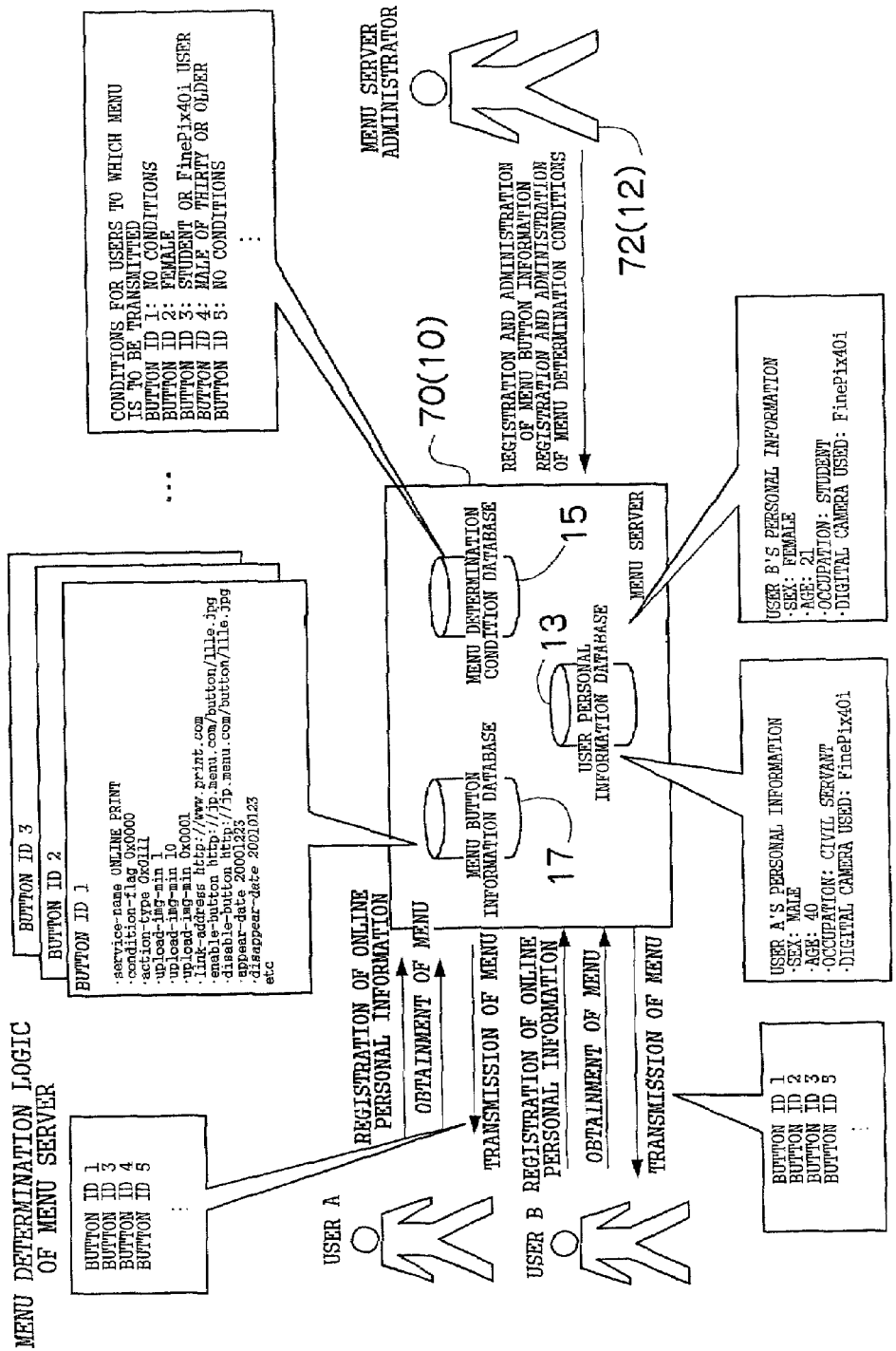

CLIENT/SERVER SYSTEM AND BUTTON UPDATING METHOD FOR CLIENT APPLICATION

BACKGROUND OF THE INVENTION

1. Field of the Invention

The present invention relates to a client/server system on a wide-area information network such as the Internet, and in particular, to an updating technique of a client application which enables data such as images to be updated or downloaded.

2. Description of the Related Art

Conventional client applications in a client/server system on the Internet have only predetermined communication functions. For example, a communication function that is activated when a corresponding button on the application is depressed (clicked) cannot be changed unless the application is upgraded.

However, even if the client application is provided with a communication function of connecting to particular URLs (Uniform Resource Locators), the fixed URLs do not allow contents services to be freely constructed or allow the client application to connect directly to newly started contents services.

SUMMARY OF THE INVENTION

The present invention is provided in view of these problems, and it is an object thereof to provide a client/server system that allows the functions of GUI buttons provided on a client application to be easily changed.

To attain the above object, the present invention is directed to a client/server system comprising a plurality of computers connected to a network, wherein: a server on the network possesses button information which is data on menu buttons operating in connection with a client application introduced into a client computer, and the server has a function of transmitting the button information to the client computer; and the client application comprises a program which causes the client computer to provide a function of communicating with the server to obtain the button information from the server, a function of displaying menu buttons on a display in combination with a GUI screen of the client application according to the button information obtained, and a function of performing operations defined for the displayed menu buttons.

According to the present invention, the client application connects to the server (menu server) present on the network to download the button information. The button information can be composed of parameter values required for the client application to execute various processes as well as button images. The operation of the client application performed when a button is pressed can be specified changing the values of parameters included in the button information. For example, for an image transfer button, the upper limit of the number of images that can be transferred can be set at a different value for each service connected using the corresponding button.

The server can provide information on menu buttons to the client in response to a request from the client application, and the client can download the information to display the various menu buttons. This enables the functions of GUI buttons provided on the client application to be easily changed, thereby allowing users to change the functions to new ones. In particular, for a function of connecting to services provided on the network, service providers can allow the types or contents of the menu buttons to be easily changed according to slight changes in services.

Preferably, the button information includes button IDs as unique identification codes defined for the menu buttons, condition flags used to determine whether the menu buttons are enabled or disabled, action types which are condition flags used to determine operation of the menu buttons, and information used to identify images of the menu buttons.

Preferably, an effective start date and time and an effective end date and time are set as parameters for the button information; and the client application provides a function of displaying the menu buttons only during this period. Thus, by setting the effective start date and time and the effective end date and time as parameters for the button information, and displaying menu buttons only when the time of the client application or computer is within this period, the present invention is applicable to connection buttons for services with specified terms.

Preferably, the GUI screen of the client application has an update button operated by a user to instruct the menu buttons to be updated; and when the update button is operated, the client application transmits an update request to the server, and in response to the update request, the server provides the button information to the client application.

Of course, the update request may be issued not only by using the update button but also automatically when the application is activated. Alternatively, the application may be programmed so that the update request is automatically issued at predetermined time intervals.

Preferably, the client application comprises an image viewer which causes the client computer to provide an image transmitting and receiving function and an image browsing function; and the menu buttons are image transmitting GUI buttons for which a destination of an image is set.

Preferably the server comprises: a database which stores personal information on users who activate the client application to access the server; and a distribution button determining device which determines contents of the menu buttons to be distributed to the users on the basis of the users' personal information; and the button information on the menu buttons determined by the distribution button determining device is delivered to the client application.

In this case, preferably, the personal information on the users is registered in the database using an online user registering function of the client application; upon registration, each user is provided with a user ID which is a unique identification code; and subsequent requests from the client application to the server are provided with the user ID so as to authenticate the user ID.

That is, upon receiving a menu update command from the client application, the server can use the already collected personal information for each user to automatically create menus according to the users' tastes, and can transmit these menus to the client computers of the corresponding users. This method enables service providers to provide well-serviced marketing for the users.

Preferably, the server transmits list information on button IDs of new menu buttons to be incorporated, to the client application which has requested the current menu buttons to be updated; upon receiving the list information, the client application compares the button IDs described in the list information with the button IDs in the button information saved in a storage device of the client computer, and requests the server to obtain the button information on the button IDs described in the list information only if these button IDs are different from the button IDs in the button information; and the server transmits the button information on the requested button IDs to the client application.

The client application can read the IDs of the buttons written in the list information (menu information) and can compare these IDs with the button information saved in the storage area of the client computer, thereby preventing the duplicate downloading of the same buttons. This avoids unwanted communications.

The present invention is also directed to a button updating method of a client application, comprising the steps of: constructing a client/server system by connecting client computers and a server together via a network; storing, in a menu button information database of the server, button information which is data on menu buttons operating in connection with a client application introduced into each of the client computers; activating the client application to communicate with the server to obtain button information therefrom; displaying the menu buttons on a display in combination with a GUI screen of the client application according to the button information obtained; and enabling operations defined for the displayed menu buttons.

Preferably, the button updating method further comprises the steps of: activating the client application to register personal information on users who access the server, in a user personal information database of the server; determining conditions for users to whom each menu button is distributed; checking the personal information on the users registered in the user personal information database against the conditions to determine menu buttons to be distributed to each user; and delivering button information on the determined menu buttons to the client application.

Preferably, the button information includes button IDs as unique identification codes defined for the menu buttons, condition flags used to determine whether the menu buttons are enabled or disabled, action types which are condition flags used to determine operation of the menu buttons, and information used to identify images of the menu buttons; the server transmits, to the client application which has requested the menu buttons to be updated, list information on button IDs of menu buttons to be incorporated; upon receiving the list information, the client application compares the button IDs described in the list information with the button IDs in the menu button information saved in a storage device of the client computer, and requests the server to obtain the button information on the button IDs described in the list information only if these button IDs are different from the button IDs in the button information; and the server transmits the button information on the requested button IDs to the client application.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 6 is a table showing contents of data contained in an event obtainment request;

FIG. 7 is a table showing the contents of data in menu information;

FIG. 8 is a view showing an example of menu information XML (service list XML);

FIG. 9 is a table showing the contents of data in button information;

FIG. 10 is a table showing the contents of data in button information;

FIG. 11 is a view showing an example of button information XML; and

FIG. 12 is a view used to describe a menu determining logic used by a menu server.

DETAILED DESCRIPTION OF THE PREFERRED EMBODIMENTS

A preferred embodiment of a client/server system and a button updating method of a client application according to the present invention will be described in detail with reference to the accompanying drawings.

Figure 1:
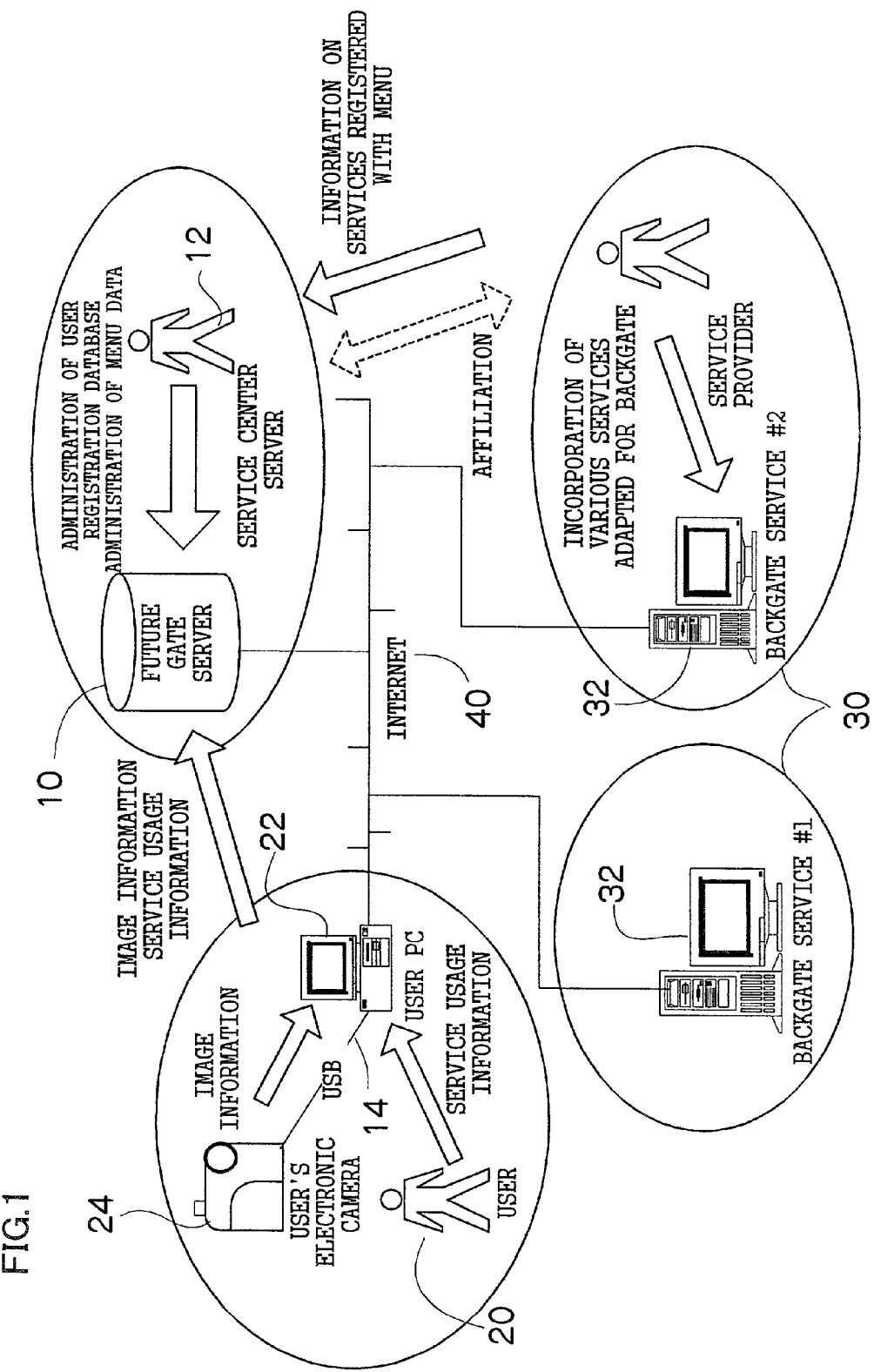
FIG. 1 is a view showing an entire construction of a client/server system according to this embodiment.

FIG. 1 is a view showing the entire construction of a system according to the embodiment of the present invention. This system is composed of a server (hereinafter referred to as an "operation administering server") 10 that administers the operation of the entire system, a computer (hereinafter referred to as a "user PC") 22 of a service user 20, and a server 32 (hereinafter referred to as a "service server") of a service provider 30 that provides printing and other services in response to requests from the user 20, the operation administering server 10, user PC 22, and service server 32 being connected to the Internet 40. The servers 10 and 32 each include a required database, and their communication specifications conform to, for example, the HTTP/1.0 and deal with the SSL (Secure Sockets Layer).

An administrator (hereinafter referred to as an "operation administrator") 12 that administers the operation of services provided by this system provides the operation administering server 10 and the service server 32 to operate services. Of course, the administrator need not possess the entire system by itself, but may implement the system by affiliating with the service provider 30. A plurality of operation administering servers 10 may be provided for each area (for example, each country) in which the services are provided.

The user 20 can communicate with the operation administering server 10 and the service server 32 using image browsing software with a communication function (hereinafter referred to as an "image viewer") which is incorporated in the user PC 22 or another communication terminal. The image viewer will be described later in detail, but comprises a function of uploading image data stored in a storage medium of an electronic camera 24 connected to the user PC 22, in the operation administering server 10, the service server 32, or other servers via the Internet 40 or downloading required data from any server.

The service provider 30 possesses a print process facility such as a printer (not shown), and prints photographs in response to an order from the user and delivers the resulting prints to the user, who has ordered the printing.

Figure 2:
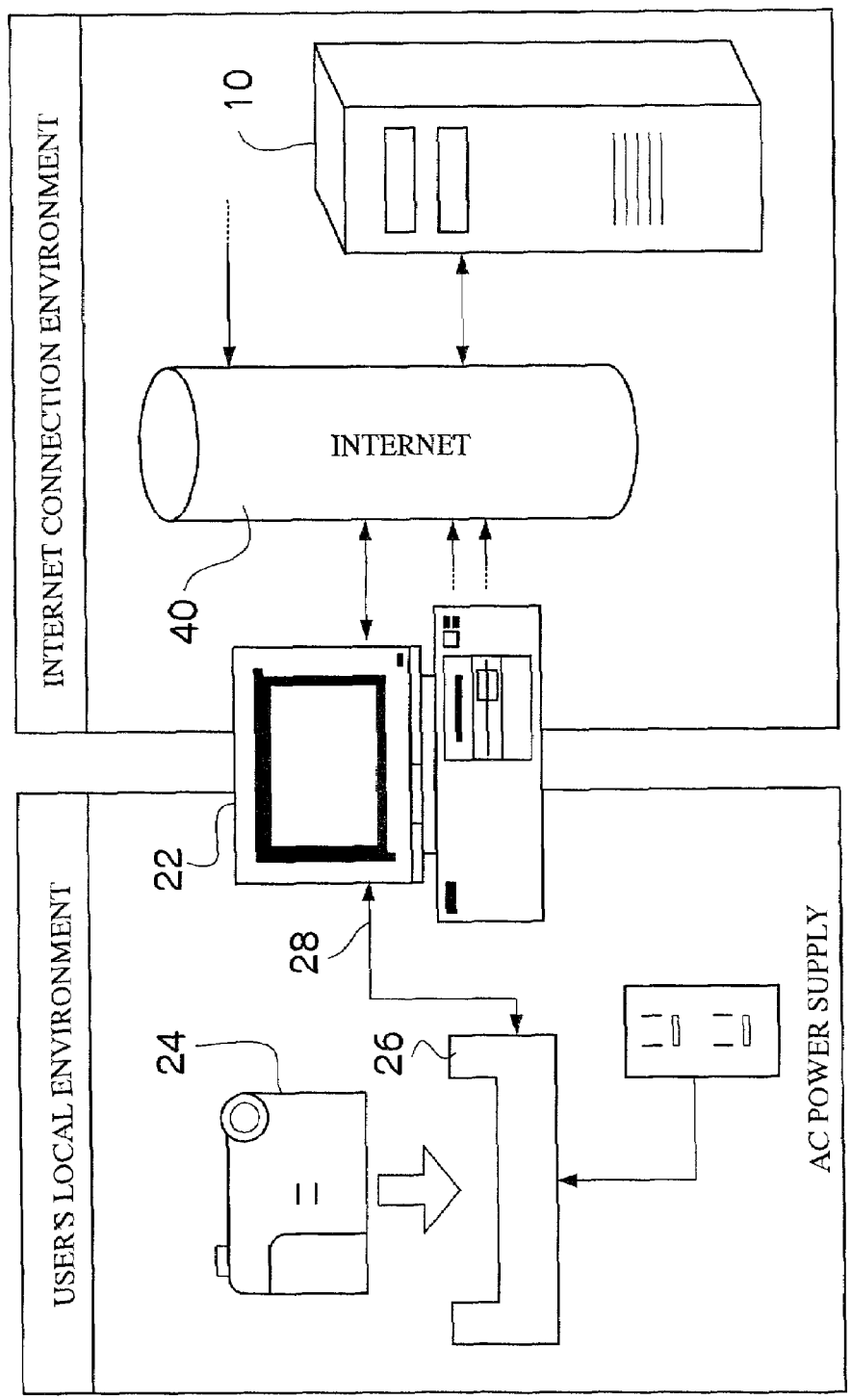
FIG. 2 is a view showing a construction of a system in which a user connects to a network using an image viewer.
Figure 3:
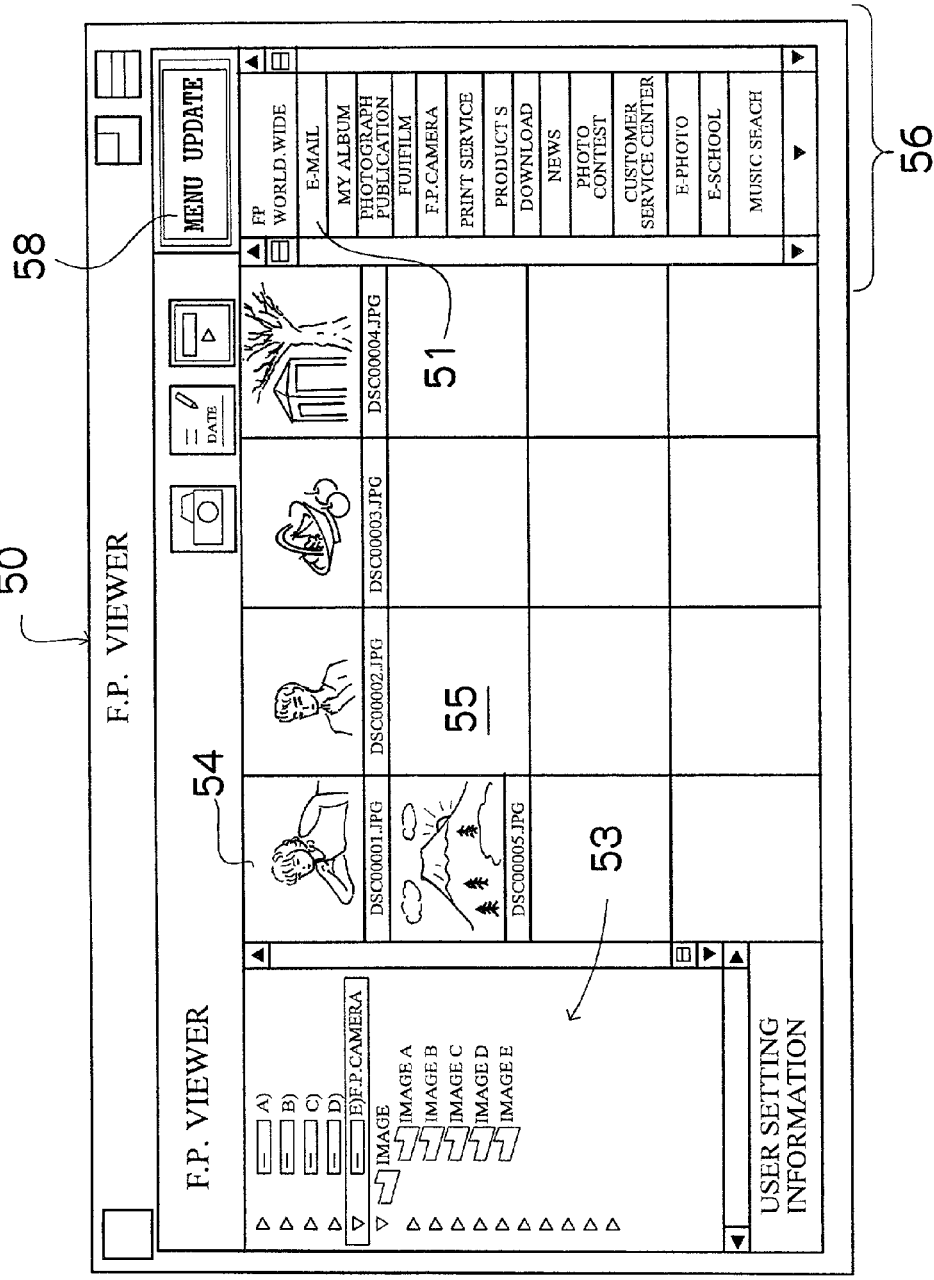
FIG. 3 is a view showing a GUI screen of the image viewer.

FIG. 2 is a view showing a construction of a system connected to the network via the image viewer. FIG. 3 is a view showing an example of a display screen (GUI screen) of the image viewer. In FIG. 2, a cradle 26 is connected to an electronic camera 24 via a communication interface such as an USB for communications, and can supply power to the electronic camera 24. The electronic camera 24 comprises an image pickup device which picks up an image of a subject and converts an optical image into an electric signal, a signal processing device that processes an image signal to convert it into a predetermined signal form, a recording device which records an image in a recording medium (a built-in memory or removable medium), and a communication device which transmits and receives information to and from other communication equipment. The electronic camera 24 may be provided with a microphone to record sound data therein.

The electronic camera 24 has a storage mode in which it functions as a storage device when connected to the user PC 22 or the like via the USB and a VC (Video Conference) mode in which it functions as a video camera used for television conferences to transmit video signals. The user can select either of the modes.

The user PC 22 automatically detects a connection of the electronic camera 24 via the communication device 28 such as the USB (using a plug & play function). When the electronic camera 24, set in the storage mode, is inserted into the cradle 26, the user PC 22 can automatically detect this connection and activate the image viewer 50 (see FIG. 3), application software that lists images from the electronic camera 24.

When the image viewer 50 is activated, the user PC 22 accesses the operation administering server 10 via the Internet 40 to obtain information such as a service menu for available services which is registered in the server 10. On the basis of the information obtained such as a service menu, as shown in FIG. 3, the window screen of the image viewer 50 displays various icons (also referred to as "menu buttons") 51.

In this regard, when a "user registration button" (not shown) is first depressed after the application of the image viewer 50 has been installed in the user PC 22, the user PC accesses a predetermined server (referred to as a "main server") to request a list of area names and the names of the corresponding local servers (area servers). The main server provides a list of area server names as required, and the user selects one of the local servers in the list by which he or she is controlled.

The user inputs personal information such as his or her name, address, zip code, e-mail address, type of a possessed electronic camera, sex, telephone number, date of birth, occupation, and password to a user registration page on the selected local server. In response to the registration, a user ID is delivered to the user and is subsequently checked upon accesses to the server for authentication. The operation administering server 10 administers the personal information on the user 20 using the user ID. Thus, menu buttons 51 or advertisements customized for every user 20 can be distributed to him or her.

As shown in FIG. 3, the window of the image viewer 50 comprises a file list display section 53 that displays a folder structure, an image list display section 55 that lists thumbnail versions 54 of images stored in a folder designated by the user, and a menu display section 56 that lists menu buttons 51 for various services. The menu display section 56 may be partially used as an advertisement display section that displays banner advertisements or the like distributed by the operation administering server 10.

The menu buttons 51 are link buttons that allow connections to the server 32 of the service provider 30, described in FIG. 1, and include service selection buttons such as a print service button, a photo CD creation service button, a photograph publication button, a photo contest contribution button, an auction site transmission button, and cellular telephone display button.

The user 20 can transmit information such as images required to order a print service, receive a photo CD creation service or a service that publishes photographs on the Internet, or upload an image file for a contribution to a photo contest or a sound file, by using a pointing device such as a mouse or an input device such as a keyboard (none of them are shown) to select one or more of the file names displayed in the file list display section 53 or one or more desired images from the list of thumbnail images 54 displayed in the image list display section 55, and then clicking the desired menu button 51.

Further, the image viewer 50 is provided with a menu update button 58. By clicking the menu update button 58 as required, the user can access the operation administering server 10 to obtain the latest menu button information.

Figure 4:
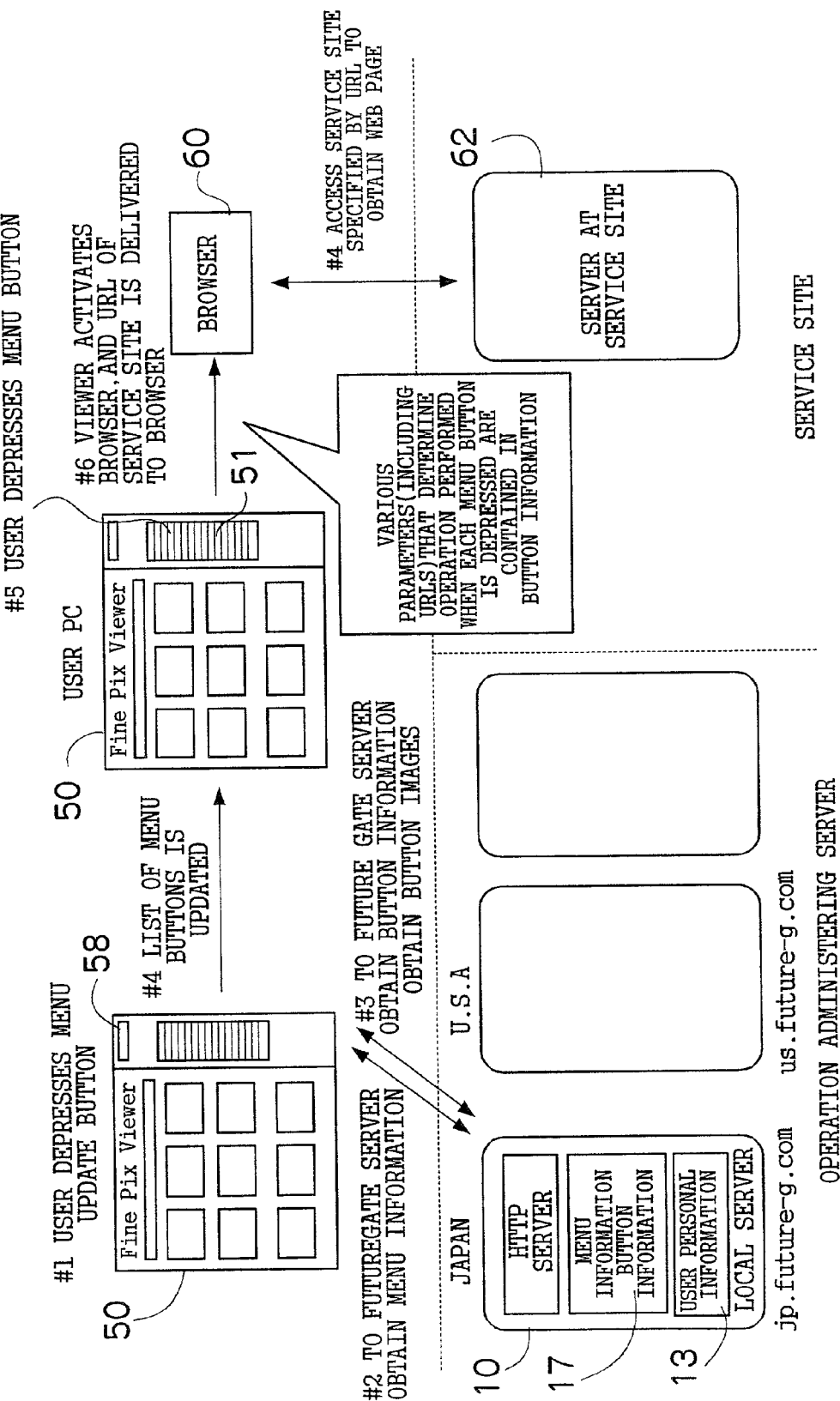
FIG. 4 is a view used to describe an application of the system of this embodiment.

Now, a menu update function of the image viewer 50 constructed as described above will be described. First, the general flow of this function will be described by referring to FIG. 4. When the user clicks the menu update button 58 of the image viewer 50, the user PC 22 accesses the local server (corresponding to the operation administering server 10) having control over services, to obtain menu information, button information, and button images. The menu information is a collection of plural pieces of button information. The button information is composed of parameter values required for the image viewer 50 in which the buttons are incorporated, to execute various processes, as well as button images. At this time, the operation administering server 10 functions as a menu server that distributes information on the menu buttons 51 to the user PC 22 (the operation administering server 10 will be referred to as a "menu server" as required).

On the basis of the menu information, button information, and button images obtained from the menu server, the list of menu buttons 51 in the image viewer 50 of the user PC 22 is updated. Various parameters (for example, the URL of a destination) that determine the operation performed when each of the menu buttons 51 is depressed are included in the button information obtained from the menu server.

When the user depresses any of the menu buttons 51, the image viewer 50 activates a WWW browser 60, and the URL of the service site is delivered to the browser. Then, the service site specified by the URL is accessed to obtain a Web page from a server 62 for the service site.

Figure 5:
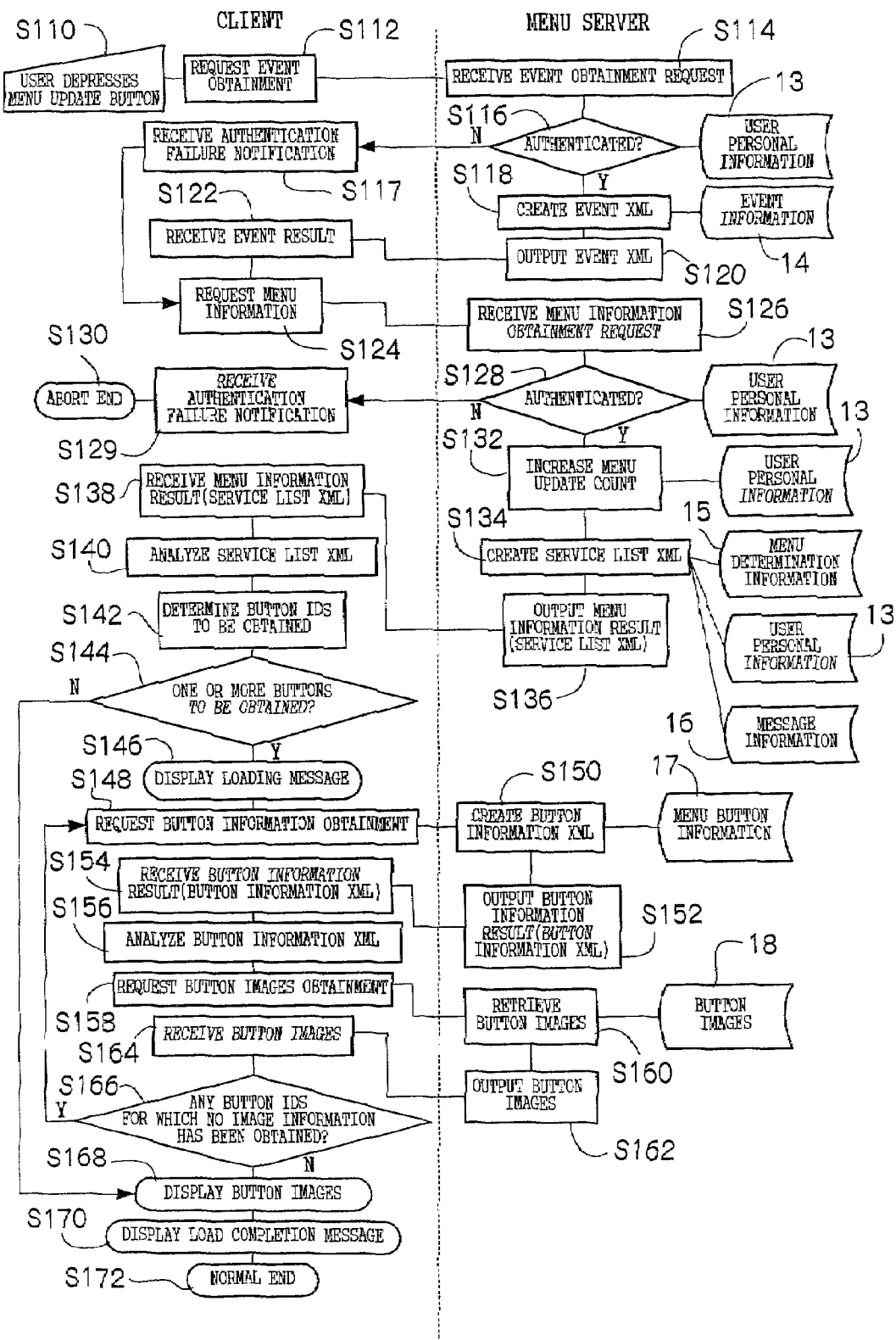
FIG. 5 is a flow chart showing a sequence used when a menu is updated.

FIG. 5 is a flow chart showing a sequence used when the menu is updated. In this figure, the left side shows a process executed by the client (user PC 22), while the right side shows a process executed by the menu server. When the user clicks the menu update button 58 on the image viewer 50 screen (step S110), an event obtainment request is transmitted by the user PC 22 (step S112). The "event" as used herein refers to a "special plan" or the "latest news", that is, information presented to the user by the operation administrator. FIG. 6 shows the contents of data contained in the event obtainment request.

In FIG. 5, the menu server receives the event obtainment request (step S114) and authenticates transmitted user ID and password (step S116). This authentication process is executed by checking the user ID and the password against the user personal information registered in a database 13. If the authentication fails in step S116, the menu server transmits a status code to the client, indicating that the "authentication has failed". When the client receives the authentication failure notification (step S117), the process jumps to processing in step S124.

If the authentication succeeds in step S116, the process proceeds to step S118 to create event XML. In this case, an event that meets the user's conditions is extracted utilizing event information stored in a database 14, and described in an XML (Extensible Markup Language) form.

The thus created event XML is transmitted to the client (step S120). When the client receives the result of the event determination (event XML) transmitted from the menu server (step S122), information on the event is displayed on the image viewer 50.

Subsequently, the user PC 22 transmits a menu information obtainment request to the menu server (step S124). Upon receiving the menu information obtainment request (step S126), the menu server authenticates transmitted user ID and password (step S128). This authentication process is executed by checking the user ID and the password against the user personal information registered in the database 13. If the authentication fails in step S128, the menu server transmits a status code to the client, indicating that the "authentication has failed". When the client receives the authentication failure notification (step S129), the menu update process sequence is ended (step S130).

If the authentication succeeds in step S128, the process proceeds to step S132. At step S132, a menu update count is incremented by one to update the count value. The count value of the number of menu updates is stored in the database 13 as user personal information.

Then, the process proceeds to step S134 to create a service list XML that meets the user's conditions. In this case, with reference to a menu determination condition database 15 and the user personal information database 13, menu buttons ID that meet the conditions are determined on the basis of the personal information on the user who has issued the menu obtainment request as well as menu determination conditions. The button IDs are identification codes uniquely (without any duplicates) defined for the menu buttons 51. Further, messages and other message information displayed on the image viewer 50 during a menu distribution process are extracted from a message information database 16. The list of button IDs and message information thus determined are described in the XML form. At this time, the display priorities of the menu buttons 51 are properly determined according to the user's conditions. A determination logic for the service list displayed to the user will be described in detail with reference to FIG. 12.

The service list XML created in step S134 in FIG. 5 is transmitted to the user PC 22 of the client as the result of the menu information retrieval (step S136). FIG. 7 shows the contents of data transmitted from the menu server to the image viewer 50 as menu information. FIG. 8 shows an example of menu information XML (service list XML).

In FIG. 5, upon receiving the service list XML (step S138), the user PC 22 analyzes the contents of the description (step S140) to determine button IDs to be obtained (step S142). That is, the image viewer 50, the client application, reads the button IDs described in the service list XML, and compares them with the button IDs saved in a service area of the user PC 22 to determine whether or not any of the button IDs in the service list has been updated. Then, the image viewer 50 determines that button information be obtained for only the added or changed buttons. This prevents the duplicate downloading of the same button information as that already retained in the user PC 22, thereby avoiding unwanted communications.

When the button IDs to be obtained are determined in step S142, it is determined whether or not one or more buttons are to be obtained (step S144). If no button is to be obtained (the result of the determination is negative), the process jumps to step S168 to display button images in the menu display section 56 of the image viewer 50 on the basis of the button information and images retained in the user PC 22 (step S168), thereby a load completion message is displayed (step S170) to end this sequence (step S172).

If it is determined in step S144 that at least one button be obtained (the result of the determination is affirmative), the process proceeds to step S146 to display a message on the screen of the image viewer 50, indicating that loading is being carried out. Then, a button information obtainment request is transmitted (step S148). The button information obtainment request contains data on session IDs and button IDs.

Upon receiving the button information obtainment request, the menu server retrieves button information on the button IDs in the request from a menu button information database 17 to create button information XML on the basis of the result of the retrieval (step S150). The thus created button information XML is transmitted to the client (step S152). FIGS. 9 and 10 show the contents of data transmitted from the menu server to the image viewer 50 as button information. FIG. 11 shows an example of button information XML.

At step S152 in FIG. 5, if the client receives the button information XML transmitted by the menu server (step S154), the client application analyzes this information (step S156). Then, the client obtains the URL of the destination of button image files which is contained in the button information, and transmits a button image obtainment request to the menu server (step S158).

The menu server retrieves button images relating to the request, from a button image database 18 (step S160), and outputs image files with the button images (step S162).

The client application receives the button images transmitted by the menu server (step S164), and subsequently determines whether or not there are any button IDs for which no button information has been obtained (step S166). If there are any button IDs for which no button information has been obtained, the process returns to step S148 to repeat the above described process (steps S148 to S166) for all the button IDs for which button information has not been obtained to obtain required button information and images.

At step S166, if it is determined that button information has been obtained for all the button IDs, the process proceeds to step S168 to display the button images in the menu display section 56 of the image viewer 50. Then, after a load completion message is displayed (step S170), this sequence is completed (step S172). Thus, the menu display section 56 of the image viewer 50 displays the latest menu buttons 51 optimized for the user. In this example, the URL of the location in which the image files are stored is used as information used to identify the button images, but data on the images themselves may be contained in the button information, which may then be provided to the client by the server.

The operation of each menu button 51 is determined by parameters in the button information, and the image viewer 50 determines the operation of the menu button according to the parameters in the button information. For example, on the basis of the result of the determination of whether or not the electronic camera is connected to a USB cable, in what mode the electronic camera is, or whether or not the image viewer is selecting images, the electronic viewer 50 determines button images to be displayed (enable or disable the buttons) and strings to be popped up when the pointer is placed on the corresponding buttons.

Furthermore, the image viewer 50 determines the following on the basis of the parameters in the button information: #1. The image viewer 50 determines URLs and their options that are delivered to the browser when the corresponding menu buttons 51 are depressed. #2. The image viewer 50 determines whether or not to transmit images when the corresponding menu buttons 51 are depressed. #3. The image viewer 50 determines the numbers of images, the sizes of images (longitudinal and lateral pixels), file sizes (capacities), and file types or the like that can be transmitted when the corresponding menu buttons are depressed. #4. The image viewer 50, when activated, determines whether or not the terms of validity of the buttons, specified by appear and disappear dates, have expired.

Next, logic that determines a service list presented to the user on the basis of the user personal information will be explained with reference to FIG. 12.

As shown in this drawing, a menu server 70 (operation administering server 10) has the menu buttons information database 17, the menu determination condition database 15, and the user personal information database 13. The administrator 72 (corresponding to the operation administrator 12) of the menu server registers and administers menu button information and menu determination conditions. The menu button information database 17 stores button information for each button ID, indicating the contents of the operation of the corresponding button.

The menu determination condition database 15 stores data specifying conditions for users to whom menus are to be transmitted. The conditions for the users to whom menus are to be transmitted are described for each button ID; a button ID 1 indicates no conditions, a button ID 2 indicates a woman, a button ID 3 indicates a student or a user of the digital camera "FinePix40i", a button ID 4 indicates a man of thirty or older, and a button ID 5 indicates no conditions.

Users (A and B) register their personal information online, which is stored in the user personal information database 13. For example, the user A's personal information includes "male", "40 years old", "civil servant", and "FinePix40i user". The user B's personal information includes "female", "21 years old", "student", and "FinePix40i user".

In this case, when the user A requests a menu from the menu server 70, the menu server 70 transmits {button ID 1, button ID 3, button ID 4, button ID 5 . . . } to the user A as the result of a check against the menu determination conditions.

Further, when the user B requests a menu from the menu server 70, the menu server 70 transmits {button ID 1, button ID 2, button ID 3, button ID 5 . . . } to the user B as the result of a check against the menu determination conditions. The subsequent process is as described for step S138 and the subsequent steps in FIG. 5.

The usage (history) of the menu server 70 or service provider 30 by the user is recorded in the operation administering server 10 as personal information. When a user ID is received from the user, information to be distributed is selected on the basis of the history for the user. Further, frequently used information from the service provider 30 may be given a higher priority, display priorities may be mutually changed, or frequently used menu buttons 51 may be displayed at such locations that these buttons are more easily selected by the user.

In the above description, the button update process is executed in response to the depression of the menu update button 58, but it may be automatically executed when the image viewer 50 is activated or periodically while the computer is online. Alternatively, the user may be asked if he or she allows the update process to be executed, when he or she depresses any of the menu buttons 51 to access the server. Alternately, if the image viewer 50 or the menu server 70 administers the history of updates and no updates have been carried out for a long time, the user may be warned about the need for an update process.

In the above embodiment, the image viewer 50 that downloads and uploads images has been described, but the application of the present invention is not limited to it. The present invention is applicable to computer programs handling various electronic data such as still images, animated images, sounds, music, and books (documents).

As described above, the server provides information on menu buttons in response to a request from the client application, and the client downloads this information to display the various menu buttons. Consequently, the functions and display forms (including button images and arrangements) of the GUI buttons incorporated in the client application can be easily changed. Further, by using user's personal information menu buttons are distributed to the user according to his or her tastes, thereby providing well-serviced marketing for him or her.

Furthermore, a list of relevant button IDs is transmitted to the client application which has requested the menu buttons to be updated, and this information is compared with the button information saved in the storage area of the client computer. This prevents the duplicate downloading of the same button information to avoid unwanted communications.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A client/server system comprising a plurality of computers connected to a network, wherein:

a server on the network stores button information which is data on menu buttons operating in connection with a client application introduced into a client computer, the client application being an image viewer, wherein the server generates customized updated button information based on a user's pre-stored personal information, and wherein the server has a function of transmitting the customized updated button information to the client computer; and the client application comprises a program for viewing a plurality of images, the image viewer including a window including a file list display section that displays a folder structure of the client computer, an image list display section that lists a reduced image of the images stored in a folder designated by a user, and a menu display section that displays a list of a plurality of menu buttons, each of the plurality of menu buttons corresponding to a service, the program causing the client computer to provide a function of communicating with the server to obtain the customized updated button information from the server, a function of displaying menu buttons on a display in combination with a GUI screen of the client application according to the customized updated button information obtained, and a function of performing operations defined for the displayed menu buttons, wherein a selected at least one image from the plurality of images in the image list display section is uploaded to a server associated with a selected menu button for performing the service associated with the selected menu button.

2. The client/sever system according to claim 1, wherein:

the GUI screen of the client application has an update button operated by a user to instruct the menu buttons to be updated; and when the update button is operated, the client application transmits an update request to the server, and in response to the update request, the server provides the customized updated button information to the client application.

3. The client/sever system according to claim 1, wherein:
the client application comprises an image viewer which causes the client computer to provide an image transmitting and receiving function and an image browsing function; and
the menu buttons are image transmitting GUI buttons for which a destination of an image is set.

4. The client/sever system according to claim 1, wherein:
the server comprises:
  a database which stores personal information on users who activate the client application to access the server; and
  a distribution button determining device which determines contents of the customized updated button information to be distributed to the users on the basis of the users' personal information; and
the button information on the menu buttons determined by the distribution button determining device is delivered to the client application.

5. The client/server system according to claim 4, wherein:
the personal information on the users is registered in the database using an online user registering function of the client application;
upon registration, each user is provided with a user ID which is a unique identification code; and
subsequent requests from the client application to the server are provided with the user ID so as to authenticate the user ID.

6. The client/sever system according to claim 1, wherein:
an effective start date and time and an effective end date and time are set as parameters for the customized updated button information; and
the client application provides a function of displaying the menu buttons only during this period.

7. The client/sever system according to claim 6, wherein:
the GUI screen of the client application has an update button operated by a user to instruct the menu buttons to be updated; and
when the update button is operated, the client application transmits an update request to the server, and in response to the update request, the server provides the customized updated button information to the client application.

8. The client/sever system according to claim 6, wherein:
the client application comprises an image viewer which causes the client computer to provide an image transmitting and receiving function and an image browsing function; and
the menu buttons are image transmitting GUI buttons for which a destination of an image is set.

9. The client/sever system according to claim 6, wherein:
the server comprises:
a database which stores personal information on users who activate the client application to access the server; and
a distribution button determining device which determines contents of the customized updated button information to be distributed to the users on the basis of the users' personal information; and
the customized updated button information on the menu buttons determined by the distribution button determining device is delivered to the client application.

10. The client/server system according to claim 9, wherein:
the personal information on the users is registered in the database using an online user registering function of the client application;
upon registration, each user is provided with a user ID which is a unique identification code; and
subsequent requests from the client application to the server are provided with the user ID so as to authenticate the user ID.

11. The client/sever system according to claim 1, wherein the button information includes button IDs as unique identification codes defined for the menu buttons, condition flags used to determine whether the menu buttons are enabled or disabled, action types which are condition flags used to determine operation of the menu buttons, and information used to identify images of the menu buttons.

12. The client/sever system according to claim 11, wherein:
an effective start date and time and an effective end date and time are set as parameters for the customized updated button information; and
the client application provides a function of displaying the menu buttons only during this period.

13. The client/sever system according to claim 12, wherein:
the GUI screen of the client application has an update button operated by a user to instruct the menu buttons to be updated; and
when the update button is operated, the client application transmits an update request to the server, and in response to the update request, the server provides the customized updated button information to the client application.

14. The client/sever system according to claim 12, wherein:
the client application comprises an image viewer which causes the client computer to provide an image transmitting and receiving function and an image browsing function; and
the menu buttons are image transmitting GUI buttons for which a destination of an image is set.

15. The client/sever system according to claim 12, wherein:
the server comprises:
a database which stores personal information on users who activate the client application to access the server; and
a distribution button determining device which determines contents of the customized updated button information to be distributed to the users on the basis of the users' personal information; and
the customized updated button information on the menu buttons determined by the distribution button determining device is delivered to the client application.

16. The client/server system according to claim 15, wherein:
the personal information on the users is registered in the database using an online user registering function of the client application;
upon registration, each user is provided with a user ID which is a unique identification code; and
subsequent requests from the client application to the server are provided with the user ID so as to authenticate the user ID.

17. The client/sever system according to claim 11, wherein:
the GUI screen of the client application has an update button operated by a user to instruct the menu buttons to be updated; and
when the update button is operated, the client application transmits an update request to the server, and in response to the update request, the server provides the customized updated button information to the client application.

18. The client/sever system according to claim 11, wherein:

the client application comprises an image viewer which causes the client computer to provide an image transmitting and receiving function and an image browsing function; and the menu buttons are image transmitting GUI buttons for which a destination of an image is set.

19. The client/sever system according to claim 11, wherein:

the server comprises:

a database which stores personal information on users who activate the client application to access the server; and a distribution button determining device which determines contents of the customized updated button information to be distributed to the users on the basis of the users' personal information; and the customized updated button information on the menu buttons determined by the distribution button determining device is delivered to the client application.

20. The client/server system according to claim 19, wherein:

the personal information on the users is registered in the database using an online user registering function of the client application;

upon registration, each user is provided with a user ID which is a unique identification code; and subsequent requests from the client application to the server are provided with the user ID so as to authenticate the user ID.

21. The client/server system according to claim 11, wherein:

the server transmits list information on button IDs of new menu buttons to be incorporated based on the customized updated button information, to the client application which has requested the current menu buttons to be updated;

upon receiving the list information, the client application compares the button IDs described in the list information with the button IDs in the button information saved in a storage device of the client computer, and requests the server to obtain the button information on the button IDs described in the list information only if these button IDs are different from the button IDs in the button information; and the server transmits the customized updated button information on the requested button IDs to the client application.

22. A button updating method of an image viewer client application, comprising the steps of:

constructing a client/server system by connecting client computers and a server together via a network;

storing, in a menu button information database of the server, button information which is data on menu buttons operating in connection with a client application introduced into each of the client computers, wherein the server generates customized updated button information based on a user's pre-stored personal information;

activating the client application, the client application comprising a program for viewing a plurality of images, the image viewer including a window including a file list display section that displays a folder structure of the client computer, an image list display section that lists a reduced image of the images stored in a folder designated by a user, and a menu display section that displays a list of a plurality of menu buttons, each of the plurality of menu buttons corresponding to a service, wherein the client application communicates with the server to obtain the customized updated button information therefrom;

displaying the menu buttons on a display in combination with a GUI screen of the client application according to the customized updated button information obtained; and enabling operations defined for the displayed menu buttons, wherein a selected at least one image from the plurality of images in the image list display section is uploaded to a server associated with a selected menu button for performing the service associated with the selected menu button.

23. The button updating method according to claim 22, wherein:

the button information includes button IDs as unique identification codes defined for the menu buttons, condition flags used to determine whether the menu buttons are enabled or disabled, action types which are condition flags used to determine operation of the menu buttons, and information used to identify images of the menu buttons;

the server transmits, to the client application which has requested the menu buttons to be updated, list information on button IDs of menu buttons to be incorporated based on the generated customized updated button information;

upon receiving the list information, the client application compares the button IDs described in the list information with the button IDs in the menu button information saved in a storage device of the client computer, and requests the server to obtain the button information on the button IDs described in the list information only if these button IDs are different from the button IDs in the button information; and the server transmits the customized updated button information on the requested button IDs to the client application.

24. The button updating method according to claim 22, further comprising the steps of:

activating the client application to register personal information on users who access the server, in a user personal information database of the server;

determining conditions for users to whom each menu button is distributed;

checking the personal information on the users registered in the user personal information database against the conditions to generate the customized updated button information to be distributed; and delivering the customized updated button information on the determined menu buttons to the client application.

25. The button updating method according to claim 24, wherein:

the button information includes button IDs as unique identification codes defined for the menu buttons, condition flags used to determine whether the menu buttons are enabled or disabled, action types which are condition flags used to determine operation of the menu buttons, and information used to identify images of the menu buttons;

the server transmits, to the client application which has requested the menu buttons to be updated, list information on button IDs of menu buttons to be incorporated based on the generated customized updated button information;

upon receiving the list information, the client application compares the button IDs described in the list information with the button IDs in the menu button information saved in a storage device of the client computer, and requests the server to obtain the customized updated button information on the button IDs described in the list information only if these button IDs are different from the button IDs in the button information; and the server transmits the customized updated button information on the requested button IDs to the client application.

26. The client/server system according to claim 1, wherein the server automatically determines the customized updated button information to send to the client application.

27. The button updating method according to claim 22, wherein the server automatically determines the customized updated button information to send to the client application.

28. An apparatus connected to a network, comprising:
a memory storing a set of instructions; and
a processor to execute the stored set of instructions to perform a method comprising:
 executing a client application, the client application providing an image viewer for viewing a plurality of images, the image viewer including a window including a file list display section that displays a folder structure of the client computer, an image list display section that lists a reduced image of the images stored in a folder designated by a user, and a menu display section that displays a list of a plurality of menu buttons, each of the plurality of menu buttons corresponding to a service,
 accessing a server on the network;
 obtaining customized updated button information from the server, wherein the server generates the customized updated button information based on a user's pre-stored personal information;
 displaying menu buttons on a display based on the obtained customized updated button information, wherein the menu buttons are associated with pre-defined operations to be performed at the apparatus,
 wherein a selected at least one image from the plurality of images in the image list display section is uploaded to a server associated with a selected menu button for performing the service associated with the selected menu button.

29. An apparatus connected to a network, comprising;
a memory for storing button information representing data on menu buttons for operation with an application executed on a client computer and a set of instructions;
a processor to execute the stored set of instructions to perform a method comprising:
 receiving a request for updated button information from a client computer executing an image viewer client application for viewing a plurality of images, the image viewer including a window including a file list display section that displays a folder structure of the client computer, an image list display section that lists a reduced image of the images stored in a folder designated by a user, and a menu display section that displays a list of a plurality of menu buttons, each of the plurality of menu buttons having associated therewith a server for providing a corresponding service;
 generating customized updated button information based on a user's pre-stored personal information; and
 transmitting the button information to the client computer in response to the request.

30. The client/server system of claim 1, wherein at least one of the menu buttons performs operations relating to image processing services.

31. The client/server system according to claim 4, wherein each of the deliverable menu buttons registered in the server is described with conditions of the users to whom menus are to be transmitted, wherein the server checks the personal information of the user, who accesses the server using the client application, with the conditions of the users, to whom menus are to be transmitted, described for each button, and determines the confirmed condition as a button to be distributed to the user.

32. The button updating method of claim 22, wherein the server comprises:
 a database which stores personal information on users who activate the client application to access the server; and
 a distribution button determining device which determines contents of the customized updated button information to be distributed to the users on the basis of the users' personal information; and
 the button information on the menu buttons determined by the distribution button determining device is delivered to the client application, and
 wherein each of the deliverable menu buttons registered in the server is described with conditions of the users to whom menus are to be transmitted, wherein the server checks the personal information of the user, who accesses the server using the client application, with the conditions of the users, to whom menus are to be transmitted, described for each button, and determines the confirmed condition as a button to be distributed to the user.

33. The apparatus according to claim 28, wherein the server comprises:
 a database which stores personal information on users who activate the client application to access the server; and
 a distribution button determining device which determines contents of the customized updated button information to be distributed to the users on the basis of the users' personal information; and
 the button information on the menu buttons determined by the distribution button determining device is delivered to the client application, and
 wherein each of the deliverable menu buttons registered in the server is described with conditions of the users to whom menus are to be transmitted, wherein the server checks the personal information of the user, who accesses the server using the client application, with the conditions of the users, to whom menus are to be transmitted, described for each button, and determines the confirmed condition as a button to be distributed to the user.

34. The apparatus according to claim 29, wherein the server comprises:
 a database which stores personal information on users who activate the client application to access the server; and
 a distribution button determining device which determines contents of the customized updated button information to be distributed to the users on the basis of the users' personal information; and
 the button information on the menu buttons determined by the distribution button determining device is delivered to the client application, and
 wherein each of the deliverable menu buttons registered in the server is described with conditions of the users to whom menus are to be transmitted, wherein the server checks the personal information of the user, who accesses the server using the client application, with the conditions of the users, to whom menus are to be transmitted, described for each button, and determines the confirmed condition as a button to be distributed to the user.

* * * * *